Patented Jan. 7, 1930

1,742,343

UNITED STATES PATENT OFFICE

KENNETH COX AND PERCIVAL JOHN McDERMOTT, OF PARSONAGE, ENGLAND, ASSIGNORS TO REFINERS LIMITED, OF MANCHESTER, ENGLAND, A BRITISH COMPANY

PURIFICATION OF BENZOL, PETROL, AND THE LIKE

No Drawing. Application filed May 8, 1928, Serial No. 276,192, and in Great Britain December 8, 1927.

This invention is an improvement in or modification of the invention described and claimed in the specification of our prior Patent No. 1,658,285 and relates to the purification of benzol, petrol and like oils or spirits by heating the same in the presence of persulphate of iron ($Fe_2[SO_4]_3$).

Our invention comprises the purification of benzol, petrol and like oils or spirits by treating them with persulphate of iron ($Fe_2[SO_4]_3$) and neutralizing them prior to distillation. Microporous earth may be used in conjunction with the persulphate as in our prior patent.

In one convenient application of our invention, the oil or spirit is heated to about 55° C. in the presence of the persulphate of iron in the usual washer or agitator which may be provided with a reflux condenser. Thereafter the oil or spirit is filtered to remove any solid matter, including the impurities brought down by the persulphate, and the filtrate is neutralized by alkali. The distillation of the filtrate is then carried out in the ordinary manner.

We may in some cases neutralize the treated oil or spirit in the washer or agitator before filtration.

What we claim is:—

1. The purification of hydrocarbon oils by heating them with persulphate of iron ($Fe_2[SO_4]_3$) neutralizing the treated oil, and then distilling it.

2. The purification of hydrocarbon oils by heating them in the washer or agitator with persulphate of iron ($Fe_2[SO_4]_3$), filtering the treated oil, neutralizing the filtrate with alkali and distilling the filtrate.

In testimony whereof we have signed our names to this specification.

PERCIVAL JOHN McDERMOTT.
KENNETH COX.